(12) United States Patent
Wideman

(10) Patent No.: US 11,618,525 B2
(45) Date of Patent: Apr. 4, 2023

(54) CONFIGURABLE HANDLEBAR RISER

(71) Applicant: Paul Wideman, Hawk Point, MO (US)

(72) Inventor: Paul Wideman, Hawk Point, MO (US)

(73) Assignee: BARE KNUCKLE CHOPPERS, LCC, Hawk Point, MO (US)

( * ) Notice: Subject to any disclaimer, the term of this patent is extended or adjusted under 35 U.S.C. 154(b) by 53 days.

(21) Appl. No.: 17/174,522

(22) Filed: Feb. 12, 2021

(65) Prior Publication Data

US 2021/0245830 A1    Aug. 12, 2021

Related U.S. Application Data

(60) Provisional application No. 62/975,491, filed on Feb. 12, 2020.

(51) Int. Cl.
| | | |
|---|---|---|
| *B62K 21/12* | (2006.01) | |
| *B62K 21/18* | (2006.01) | |
| *B62K 21/24* | (2006.01) | |
| *B62K 21/16* | (2006.01) | |
| *B62K 21/22* | (2006.01) | |

(52) U.S. Cl.
CPC .............. *B62K 21/24* (2013.01); *B62K 21/16* (2013.01); *B62K 21/22* (2013.01)

(58) Field of Classification Search
CPC ........ B62K 19/32; B62K 21/16; B62K 21/20; B62K 21/22; B62K 21/24; B62D 1/184; Y10T 403/32426
See application file for complete search history.

(56) References Cited

U.S. PATENT DOCUMENTS

| | | | | |
|---|---|---|---|---|
| 5,829,316 A | * | 11/1998 | Krizman, Jr. .......... | B62K 21/12 74/551.8 |
| 6,920,806 B2 | * | 7/2005 | Cutsforth ............... | B62K 21/12 74/551.8 |
| 7,344,329 B2 | | 3/2008 | Hutchinson et al. | |
| 7,699,331 B2 | * | 4/2010 | McVickar .............. | B62K 21/22 74/551.8 |
| 10,118,663 B2 | * | 11/2018 | Wada ..................... | B62K 21/12 |

(Continued)

FOREIGN PATENT DOCUMENTS

| | | | | |
|---|---|---|---|---|
| DE | 4332543 A1 | * | 3/1994 | ............ B62K 19/32 |
| WO | WO-03086845 A1 | * | 10/2003 | ............ B60R 25/00 |

*Primary Examiner* — Adam D Rogers
(74) *Attorney, Agent, or Firm* — Sandberg Phoenix & von Gontard PC

(57) ABSTRACT

A motorcycle handlebar riser having upper and lower members. The upper member has a proximal end and a distal end. A first vertical plane laterally bisects the upper member. The upper member distal end has a bar bed to hold a handlebar. The upper member proximal end has a generally flat first attachment face oriented at a predetermined angle relative to the first vertical plane. The lower member has a proximal end and a distal end that releasably attaches to the motorcycle front fork. A second vertical plane laterally bisects the lower member. The lower member proximal end has a generally flat second attachment face oriented at a predetermined angle relative to the second vertical plane. The riser assembles in a first configuration when the attachment faces are axially aligned in one orientation and assembles in a second configuration when the attachment faces are axially aligned in a different orientation.

18 Claims, 14 Drawing Sheets

(56) References Cited

U.S. PATENT DOCUMENTS

2004/0016316 A1\* 1/2004 Bechler .................. B62K 21/16
  74/551.3
2008/0203699 A1\* 8/2008 Truchinski ............. B62K 21/14
  280/276

\* cited by examiner

CONFIGURABLE HANDLEBAR RISER

CROSS-REFERENCE TO RELATED APPLICATIONS

This application claims priority to provisional application Ser. No. 62/975,491 filed Feb. 12, 2020 which is incorporated herein by reference.

STATEMENT REGARDING FEDERALLY SPONSORED RESEARCH

Not Applicable.

BACKGROUND

The present disclosure relates to a handlebar riser for a motorcycle or similar vehicle that detachably installs on such vehicles for the ready and multi-configurable attachment of a handlebar or similar component to the vehicle. More particularly, it relates to a detachable handlebar riser that is readily adaptable to more than one configuration to enable the selective repositioning of the handlebar for attachment to the vehicle in more than one position or orientation relative to the vehicle.

One of the numerous components that comprise a motorcycle, or other similar vehicles, is a grip or hand hold to enable the vehicle driver to use his/her hands to control the direction of the vehicle during operation and/or to facilitate various other operations related to the operation of the vehicle. This may include, for example, acceleration or braking controls, horn switches, rear-view mirrors, start and shut-off switches, and the like. In order to provide steering control, the grip or hand hold component must be operatively connected to one or more of the vehicle wheels, and typically the vehicle's front wheel. One such common grip is known as a handlebar.

Typically, a handlebar is cradled above the front wheel or front when assembly in a pair of sockets or troughs, known as "bar beds". A bar bed can be an integral part of, or can be a separate construct that attaches to, the top of a vertically oriented rigid component known as a riser. Although a vehicle can have a riser that is constructed as a single unit, risers are typically constructed in matching pairs. That is, a pair of risers will generally extend upward from a cross-brace, known as a yoke or "top triple clamp", positioned above the front wheel that attaches to the front fork, where the front fork extends downward on each side of the wheel to attach to a horizontal front wheel axle that extends through the center of the front wheel and out each side. Typically, it is desirable for the handlebar to extend outward in each direction a symmetric distance from the center plane of the front wheel. Thus, the central portion of the handlebar is generally securely fastened, and usually clamped, in a uniform position in both of the bar beds for a pair of risers attached to a motorcycle (or other such vehicle), such that turning the handlebar will be centered above the front wheel and will allow the rider to controllably turn the vehicle's associated wheel or wheels.

Unfortunately, traditional handlebar risers are only capable of holding the handlebars in one position or orientation relative to the vehicle's yoke (top triple clamp), and are not configured to alter or modify that orientation. That is, although the handlebar may be rotated about the axis of the central portion fastened to the bar beds such that the handlebar may be secured to the risers in a number of rotational orientations, the central portion of the handlebar itself will always be secured in the same position relative to the risers themselves, and therefore relative to the vehicle's yoke (top triple clamp). However, it is often desirable to attach a handlebar to a motorcycle or other such vehicle in a manner such that the central portion of the handlebar may be positioned at different orientations relative to the yoke (top triple clamp).

For example, vehicle riders of different heights, or having differing arm lengths, may want the handlebars to be positioned higher or lower relative to the yoke (top triple clamp) to accommodate the rider's riding preferences and comfort. Alternatively, as a matter of personal preference, a rider may simply desire to have the handlebars positioned lower or higher relative to the yoke (top triple clamp). While there exist handlebar risers in the art that provide for selective height adjustment for the handlebar relative to the yoke (top triple clamp) (see, e.g., U.S. Pat. No. 7,344,329), such prior designs have their shortfalls. For example, U.S. Pat. No. 7,344,329 is a very complex design that is costly to manufacture and provides only a limited amount of extension.

Moreover, some riders may want the handlebars positioned more forward or more rearward over the top triple clamp (i.e., closer to, or further away from, the rider), which may include angular displacement of the handlebar relative to the yoke (top triple clamp). Applicant is unaware of any product in the art, other than the present disclosure, that provides a handlebar riser with any such capability. Rather, traditionally, the only way to make such adjustments has been to modify (i.e., cut, bend or reshape) the risers, or to replace the entire set of risers with a different set of risers having a different shape. It would be desirable to be able to readily and securely attach a handlebar to a riser or set of risers on a motorcycle or similar vehicle at more than one lateral and/or angular orientation relative to the vehicle's top triple clamp without having to modify or replace the handlebar risers.

Therefore, there exists a need for a handlebar riser assembly that is easily configurable so as to allow a user to selectively secure a handlebar or other similar component to a motorcycle or other similar vehicle in more than a single position and/or orientation relative to the motorcycle's or vehicle's front fork or similar assembly.

DESCRIPTION OF THE DRAWINGS

In the accompanying drawings which form part of the specification.

Corresponding reference numerals indicate corresponding parts throughout the several figures of the drawings.

DETAILED DESCRIPTION

Figure 1:
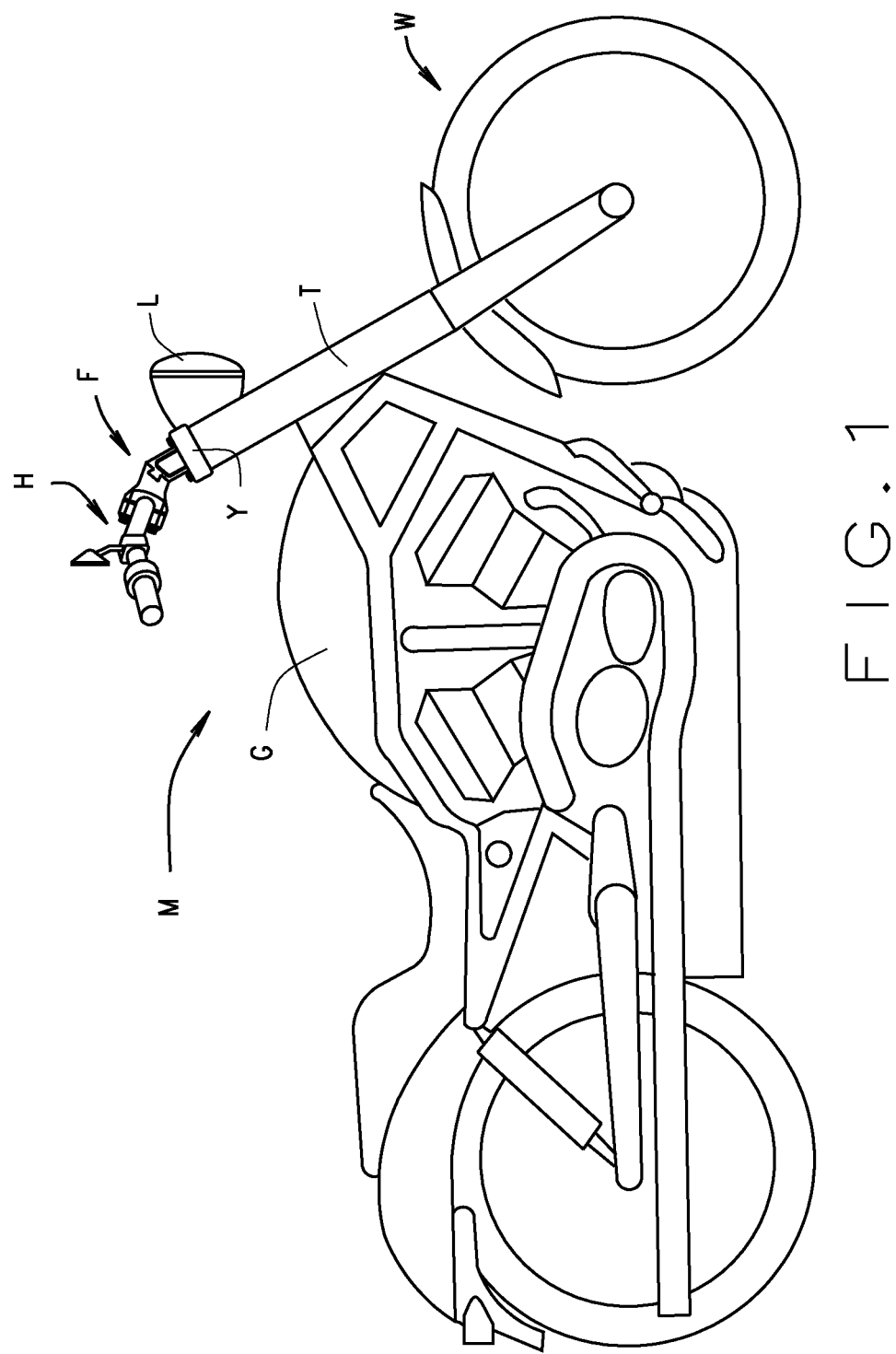
FIG. 1 is a side view of a representative motorcycle incorporating a first representative embodiment of a handlebar riser assembly comprising one or more features of the present disclosure.
Figure 2:
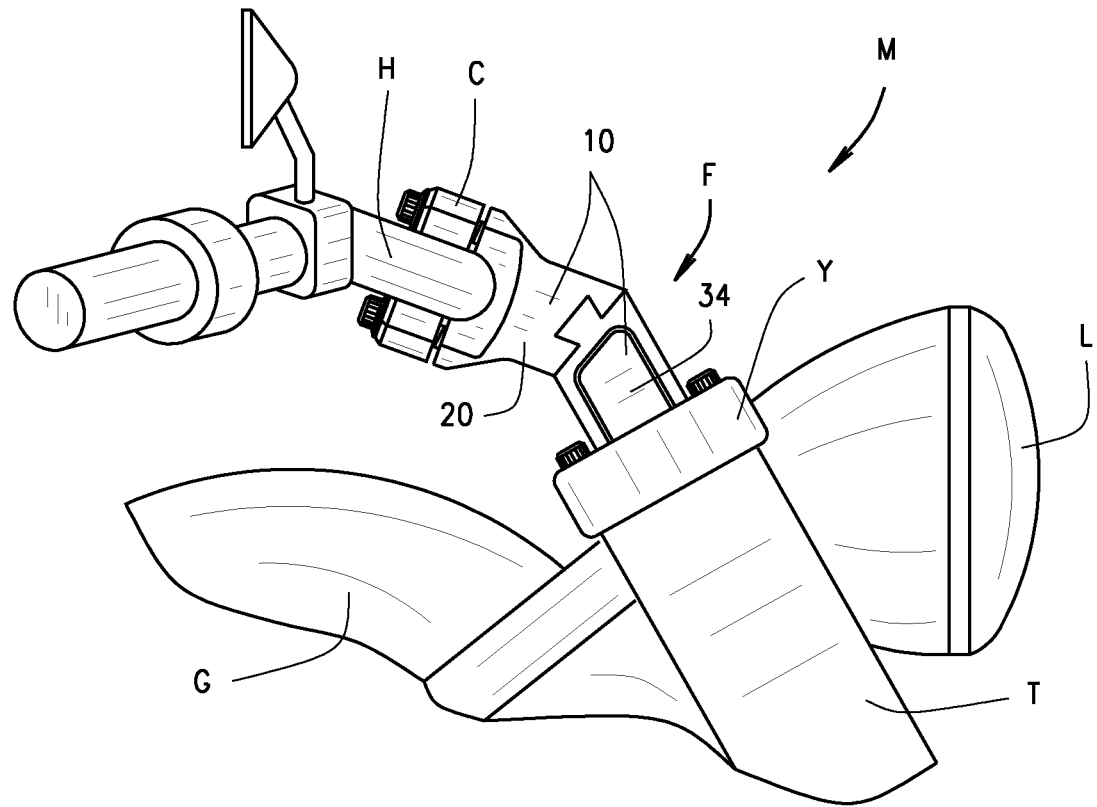
FIG. 2 is a side view of the upper portion of the front end of the motorcycle of FIG. 1, showing the representative riser assembly in an angular configuration (A1)

The following detailed description illustrates the claimed invention by way of example and not by way of limitation. The description clearly enables one skilled in the art to make and use the disclosure, describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

Figure 3:
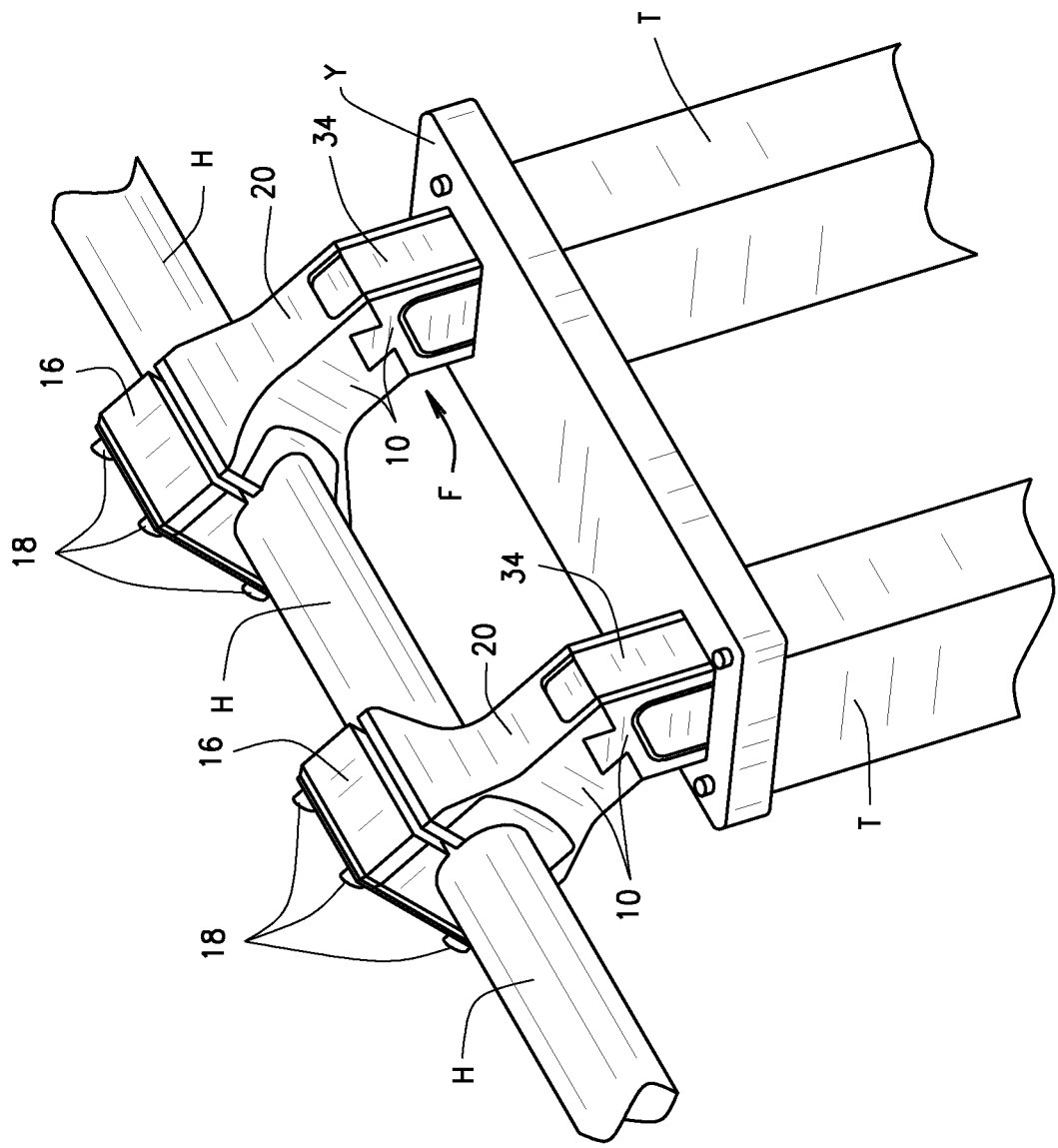
FIG. 3 is perspective view of the riser assembly of FIG. 2.
Figure 4:
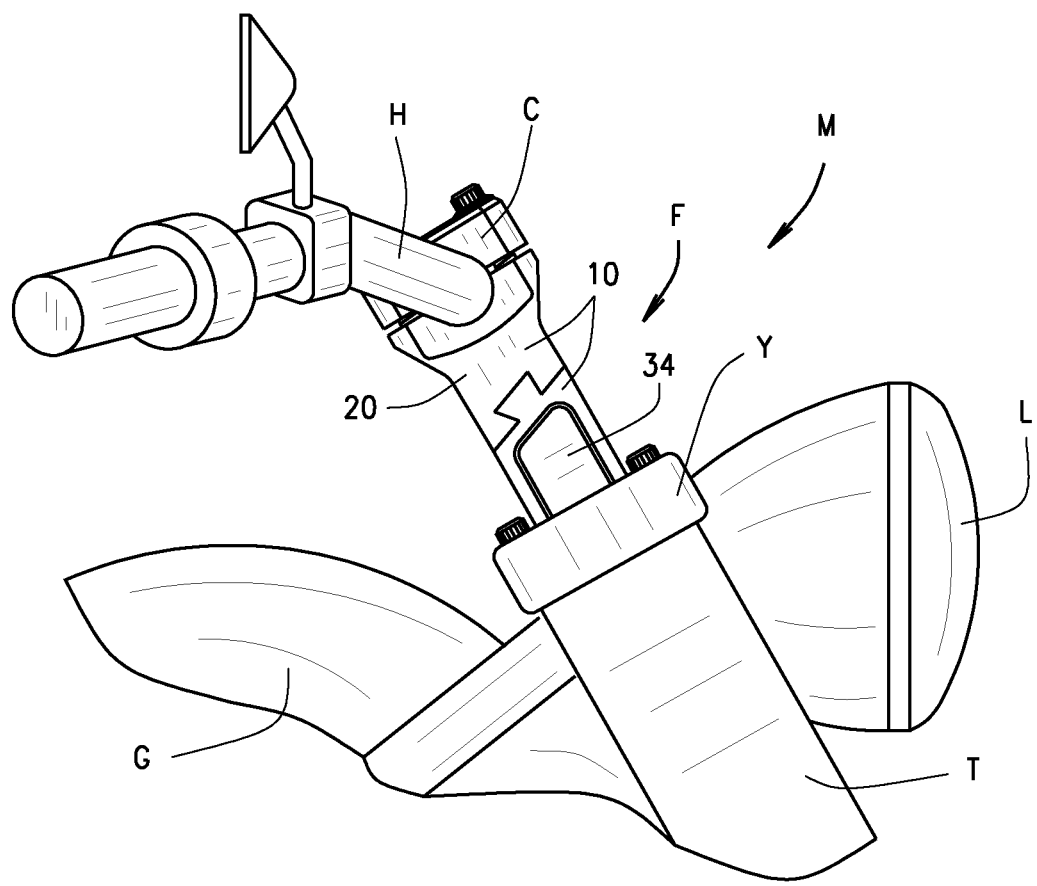
FIG. 4 is a side view of the upper portion of the front end of the motorcycle of FIG. 1, showing the representative riser assembly in a straight configuration (A2)
Figure 5:
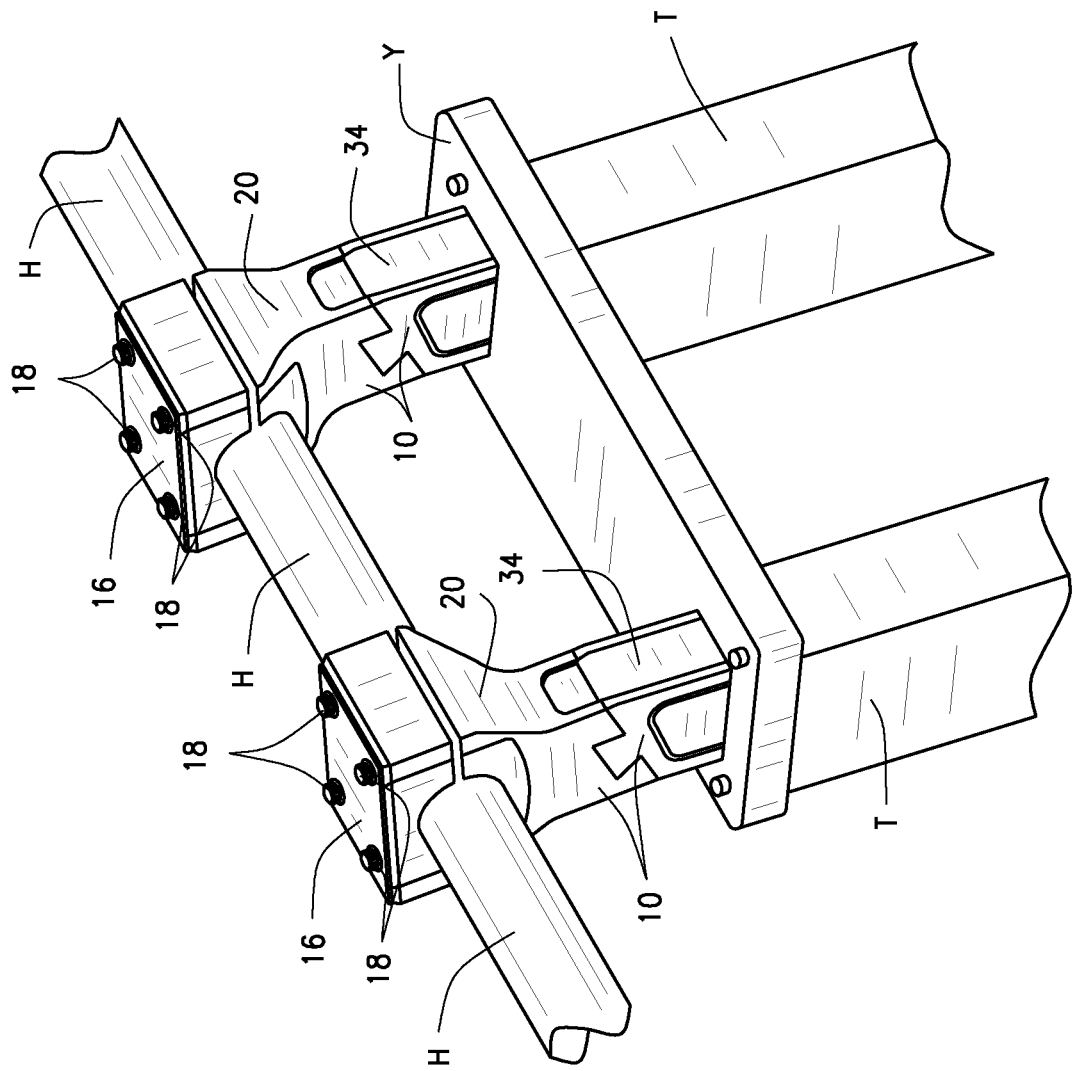
FIG. 5 is perspective view of the riser assembly of FIG. 4.
Figure 6:
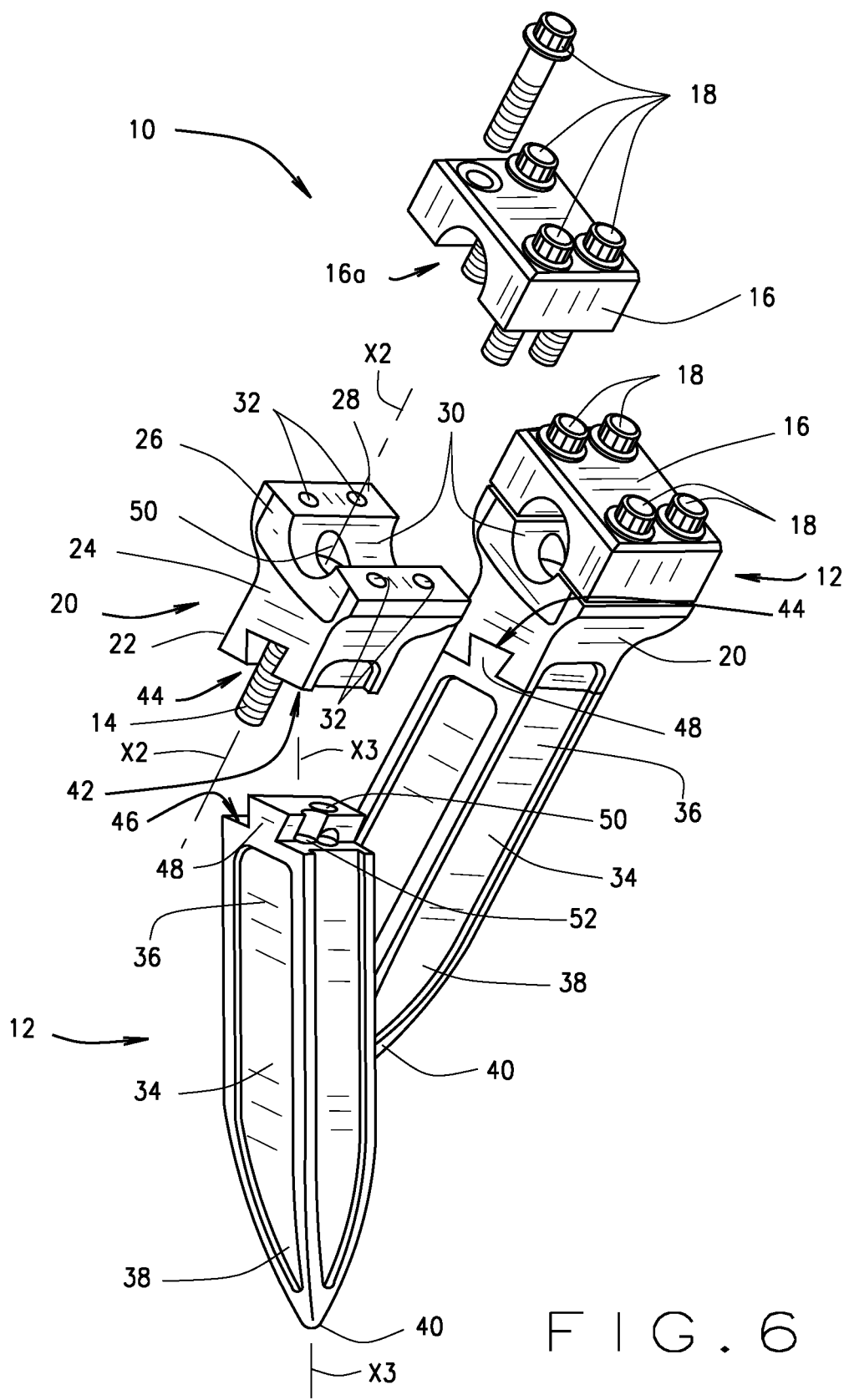
FIG. 6 is a perspective and partially exploded view of the first representative embodiment of the riser assembly of FIG. 1, isolated from the motorcycle.
Figure 7:
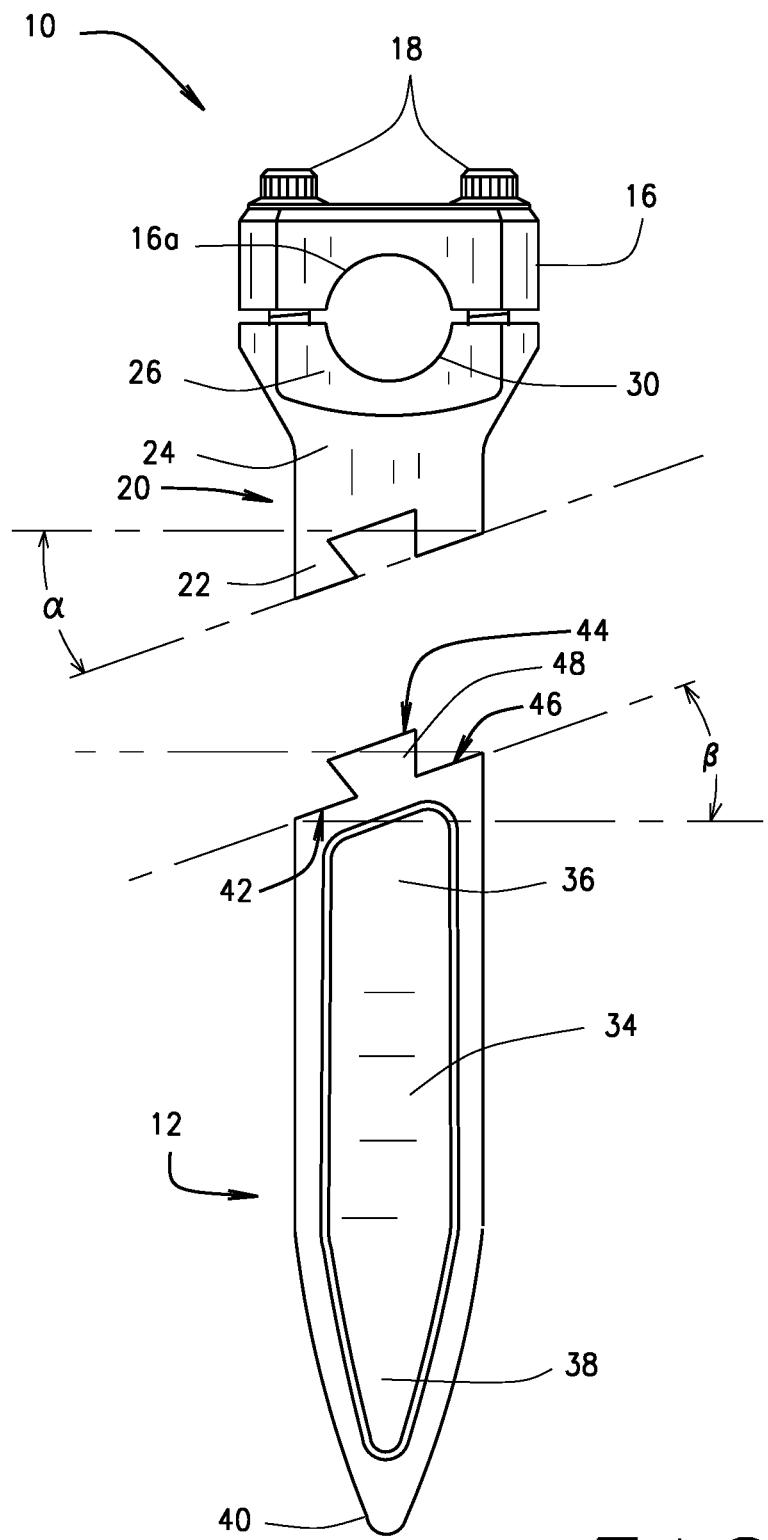
FIG. 7 is a side view of the riser assembly of FIG. 6, partially exploded and showing the angles α and β relative to the upper and lower members.

As can be seen in FIG. 1, the front end of a typical motorcycle M includes a front fork F that extends forward and downward from just in front of a gas tank G, and below a front headlight L, to attach to and secure a front wheel W to the vehicle. The front fork F includes two partially hollow tubes T (see, e.g., FIGS. 3, 5). Positioned atop and connecting the two tubes T of the front fork F is a top yoke or triple clamp Y. Inserted partially into and extending upward from each of the tubes T of the front fork F is a riser R (shown for representative purposes in FIG. 1 as an embodiment of the riser of the present disclosure). A handlebar H is secured to the top of the risers R with a bar clamp C.

Referring now to FIGS. 2-9, a first representative embodiment of the present disclosure, generally referred to as a riser assembly 10, includes two identical risers 12, an anchor bolt 14 for each of the risers 12, two matching bar clamps 16, and a set of four clamp bolts 18 for each bar clamp 16. Each of the risers 12 is formed of a strong rigid material such as machined steel, another strong metal, or a strengthened plastic such as a glass-filled polymer.

Each riser 12 comprises an upper member 20 having a proximal end 22 and a distal end 24 opposite the proximal end 22. The upper member 20 has a uniform generally square cross-sectional shape that expands outward into a bar bed 26 near the distal end 24. Of course, the upper member 20 may alternatively be configured in a variety of other cross-sectional shapes, including for example, circular, oval and hexagonal, so long as the upper member 20 is adapted to provide the functionality as described herein. In addition, and referring to FIGS. 8-10, a generally central lateral plane P1 extends from the center of the proximal end 22 to the center of the distal end 24 of the upper member 20. The bar bed 26 includes a generally flat and horizontal face 28 oriented laterally perpendicular to the lateral plane P1. A straight trough or channel 30 extends across the entire face 28 of the bar bed 26. The channel 30 has a uniform semi-circular cross-section along its entire length with a central axis X1 at its radial midpoint. The channel 30 is likewise horizontal and oriented such that the axis X1 forms a part of the lateral plane P1. Additionally, the upper member 20 has a vertically oriented central axis X2 that extends generally through the center of the upper member 20 from the center of the proximal end 22 to the center of the distal end 24. The axis X2 lies within the plane P1.

Referring back to FIGS. 2-9, a set of four threaded bolt holes 32 are formed in the face 28, having one such bolt hole 32 at each corner of the face 28. The bolt holes 32 are shaped and sized to match and threadingly receive the bolts 18. Of course, it is not required that the number of bolts 18 equals four, but rather any number of bolts 18 and matching bolt holes 32 may be used to attach the bar clamp 16 to the upper member 20, so long as the bar clamp 16 can be adequately secured. Further, alternately other fasteners, such as for example, screws, latches or clamps, may be used in place of bolts to secure the bar clamp 16 to the upper member 20, so long as the bar clamp 16 can be adequately secured.

The bar clamps 16 each have a straight trough or channel 16a that extends across the entire face of the clamp 16. The channel 16a has a uniform semi-circular cross-section along its entire length with the central axis X1 at its radial midpoint (see FIG. 9) when the clamp 16 is properly and fully secured to the bar bed 26, such as with the bolts 18. The bar clamp 16 is shaped and sized to mate with the flat face 28 of the upper member 20 such that the channel 16a and the channel 30 together form a cylindrical tube sized to securely fasten a handlebar, such as the handlebar H, to the top of the risers 12 when the bar clamp 16 is tightened to the bar bed 26 of the upper member 20 by the riser clamp bolts 18.

Each riser 12 further comprises a lower member 34 that likewise has a proximal end 36 and a distal end 38 opposite the proximal end 36. The lower member 34 has a uniform generally square cross-sectional shape that transitions into a truncated cone 40 near the distal end 38. The cross-sectional shape of the lower member 34 is adapted such that the distal end 38 fits snugly through the yoke (top triple clamp) Y into the upper end of one of the two tubes T. One of ordinary skill in the art will recognize that the truncated cone 40 facilitates the initial placement of the lower member 34 through the yoke (top triple clamp) Y and into the tubes T. In addition, again referring to FIGS. 8-10, a generally central lateral plane P2 extends from the center of the proximal end 36 to the center of the distal end 38 of the lower member 34. The planes P1 and P2 are transversely aligned with one another. Additionally, the lower member 34 has vertically oriented central axis X3 that extends generally through the center of the lower member 34 from the center of the proximal end 36 to the center of the distal end 38. The axis X3 lies within the plane P2.

Referring again to FIGS. 2-9, for each of the risers 12, the proximal end 24 of the upper member 20 and the proximal end 36 of the lower member 34 are configured to interlock so as to form a single contiguous riser 12. More particularly, and referring to FIG. 7, the proximal end 24 of the upper member 20 includes a flat face 42 oriented laterally perpendicular to and horizontally at an angle α of approximately 20 degrees relative to the central plane P1. In addition, a straight and uniform key slot 44 extends across the entire face 42 in an orientation parallel to the plane P1, and preferably such that the plane P1 longitudinally bisects the slot 44. Conversely, the proximal end 36 of the lower member 34 includes a flat face 46 oriented laterally perpendicular to and horizontally at an angle β of approximately 20 degrees relative to the lateral plane P2, the angle β being equal to the angle α. A straight and uniform bulbous protrusion or dovetail 48 extends across the entire face 46 in an orientation parallel to the plane P2, and preferably such that the plane P2 longitudinally bisects the dovetail 48.

Figure 8:
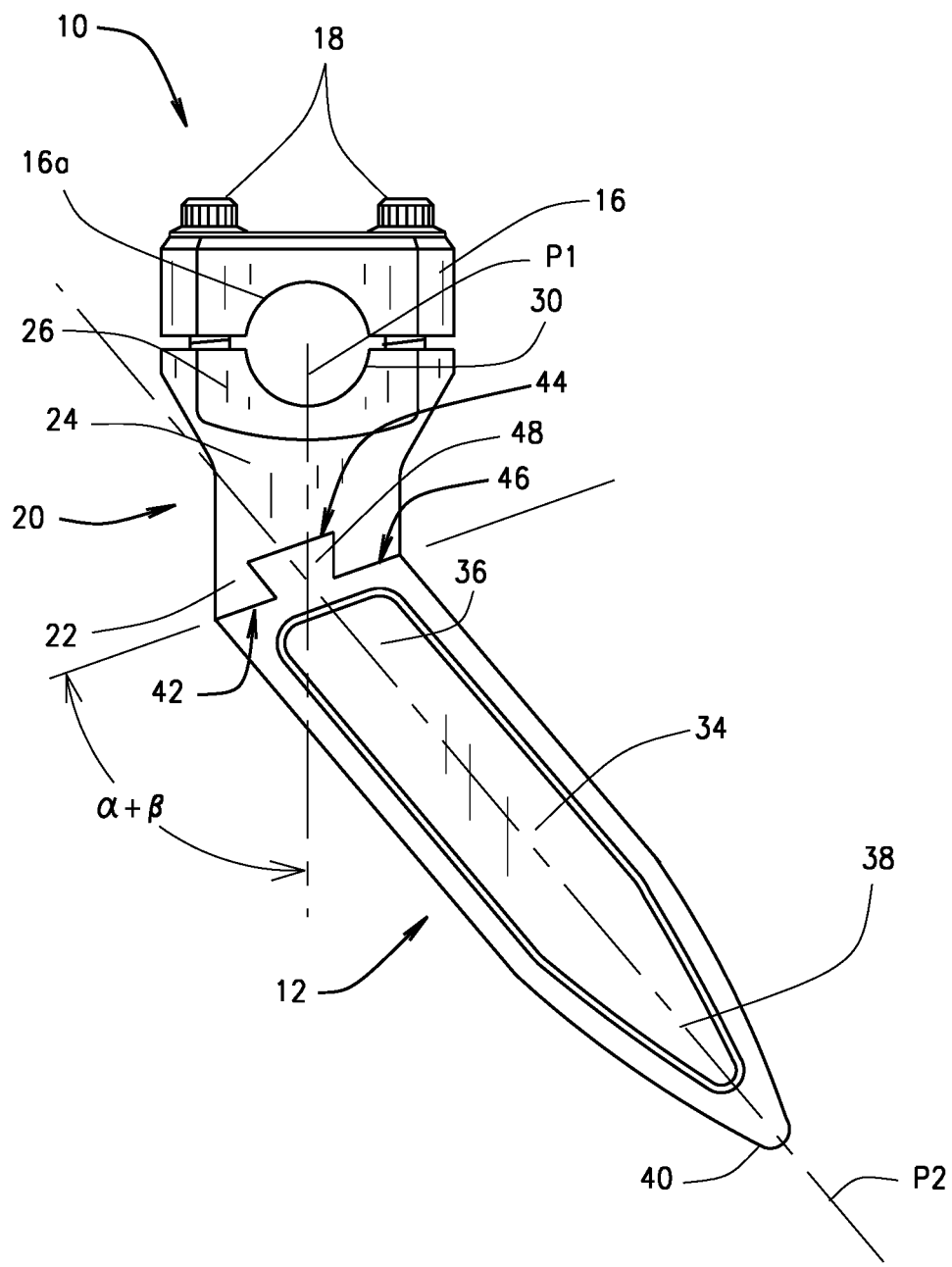
FIG. 8 is a side view of the riser assembly of FIG. 6, with the riser in an angular configuration (A1)
Figure 9:
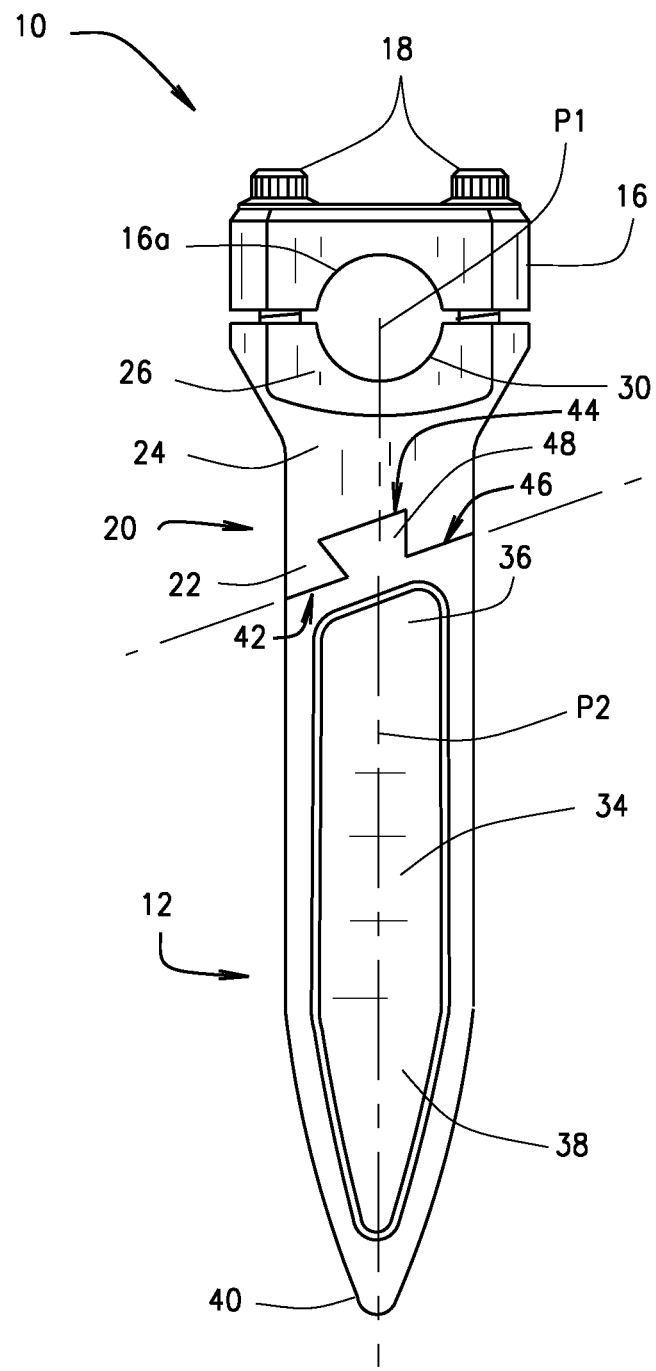
FIG. 9 is an alternate perspective view of the riser assembly of FIG. 6, with the riser in a straight configuration (A2)
Figure 10:
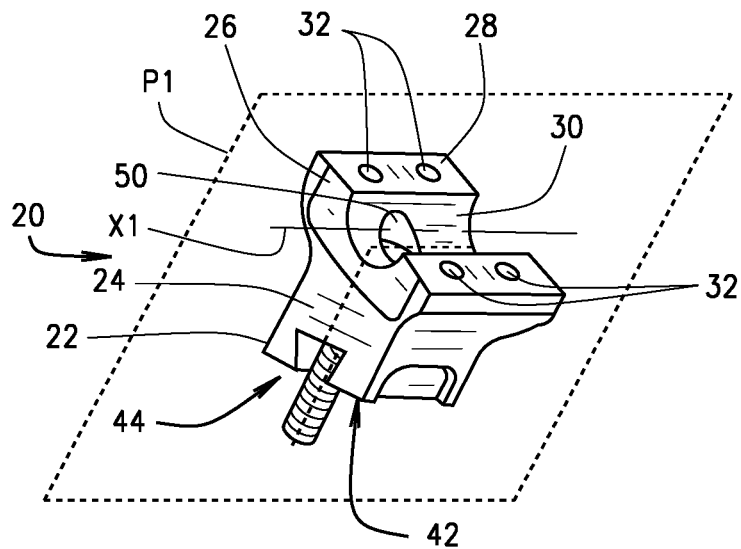
FIG. 10 is a perspective and partially exploded view of the upper and lower members depicted in FIG. 6, showing planes of interest associated with the upper and lower members.
Figure 10:
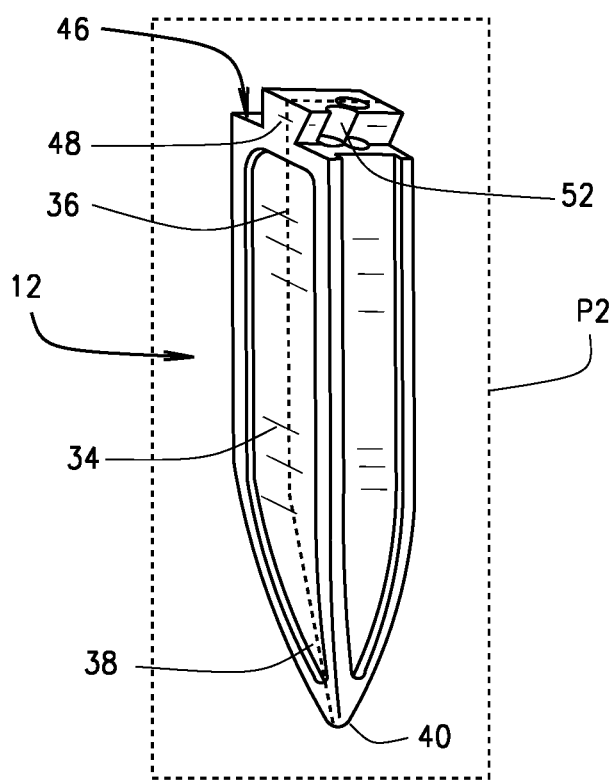
Figure 11:
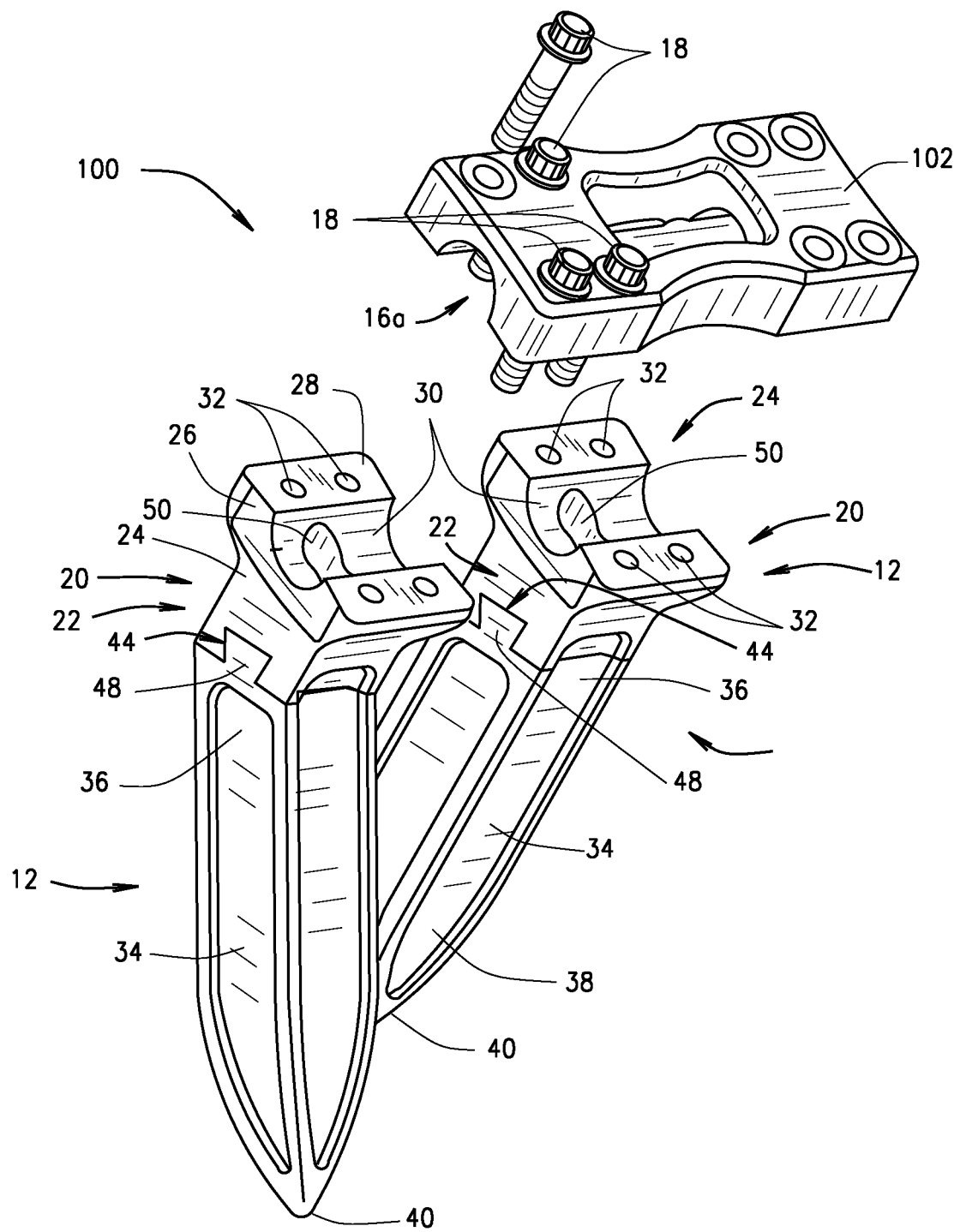
FIG. 11 is a perspective and partially exploded view of a second representative embodiment of a handlebar riser assembly comprising one or more features of the present disclosure.
Figure 12:
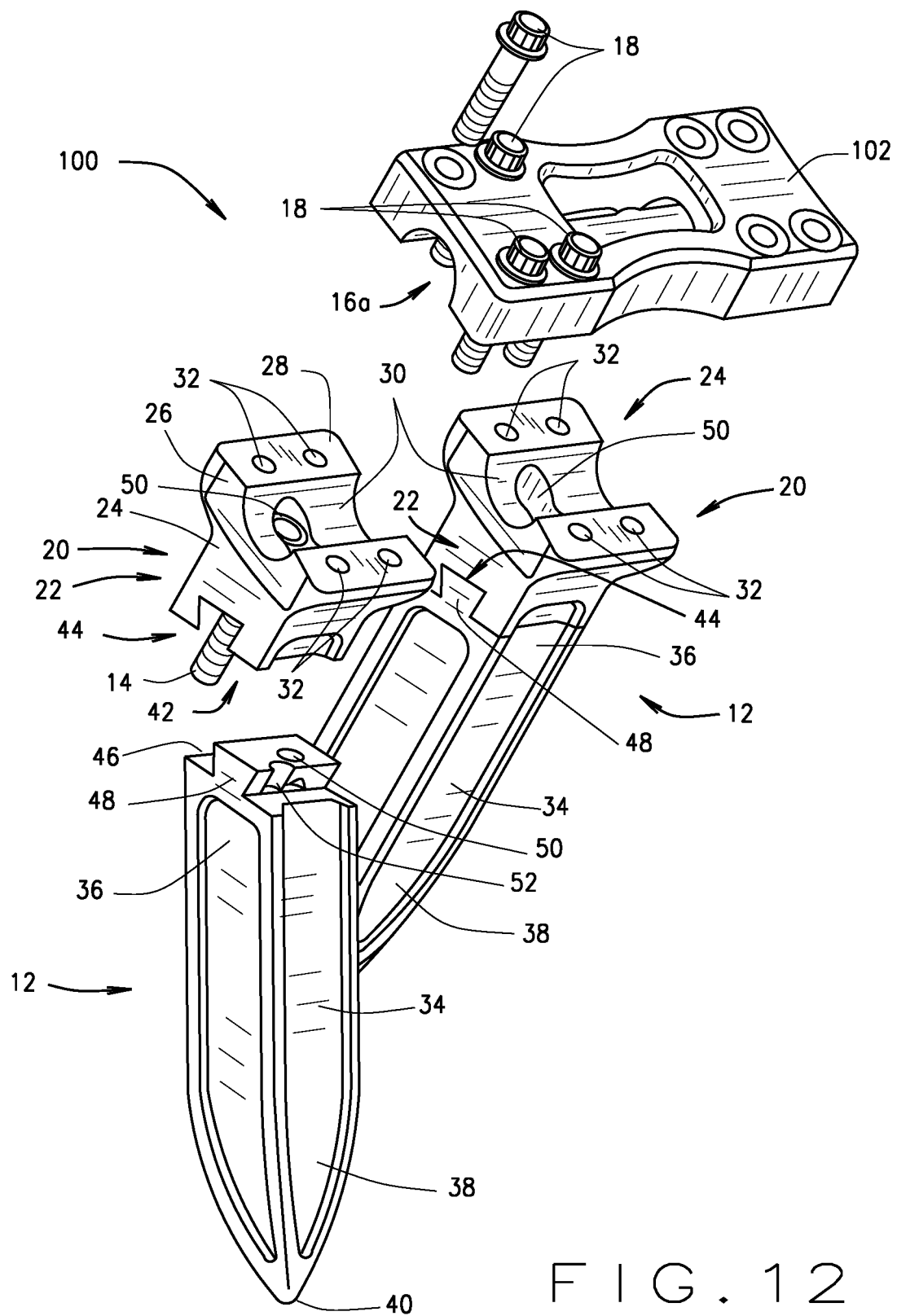
FIG. 12 is an alternate perspective and partially exploded view of the riser assembly of FIG. 10.
Figure 13:
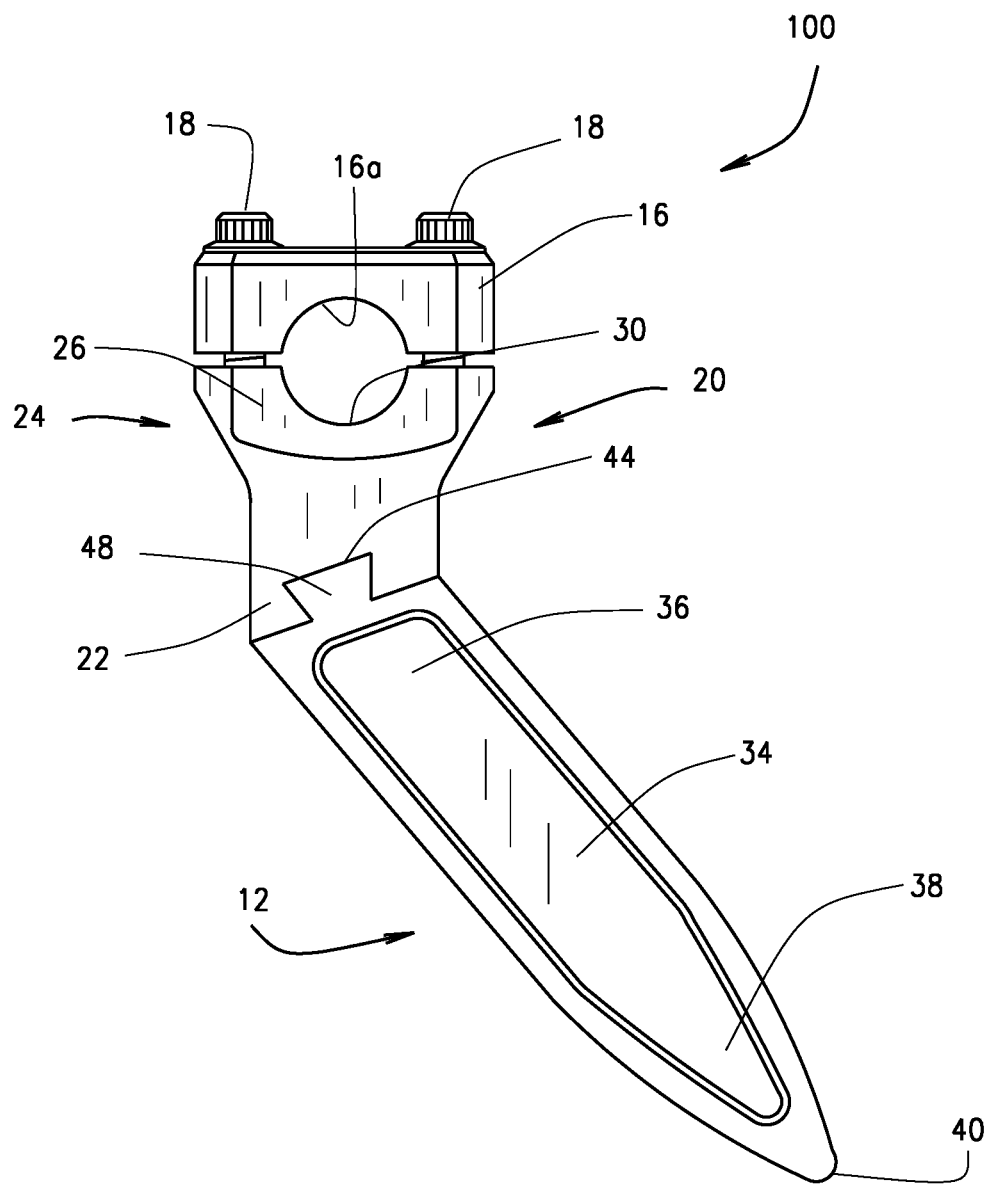
FIG. 13 is a side view of the riser assembly of FIG. 10, with the riser in an angled configuration.
Figure 14:
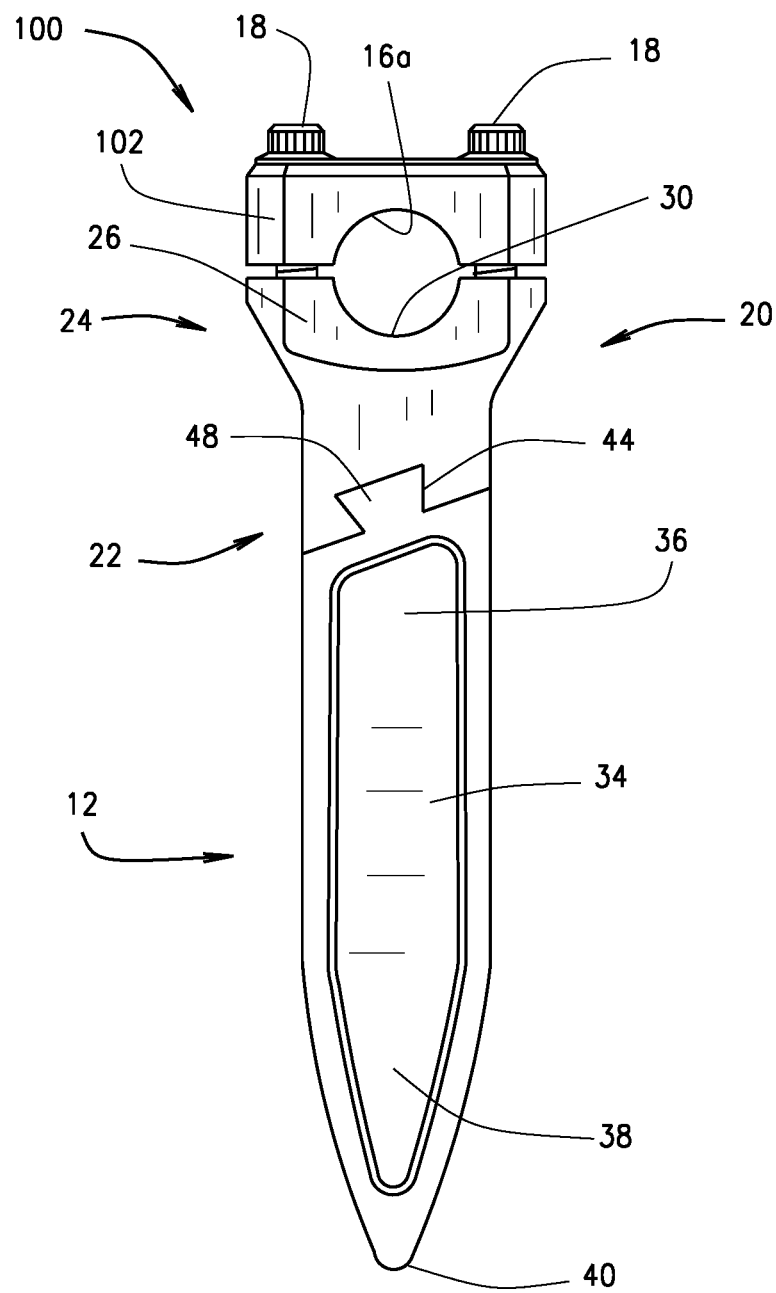
FIG. 14 is an alternate perspective view of the riser assembly of FIG. 10, with the riser in a straight configuration.

As can be appreciated, the cross-section of the dovetail 48 is configured to slip or slide freely yet snugly into the key slot 44 in one of two alignments or orientations, A1 and A2 (shown in FIGS. 8-9). In first alignment or orientation A1 (FIGS. 2, 8), where the faces 42 and 46 are mated complementary to one another such that the plane P1 diverges from the plane P2, the angles α and β add together to form a combined dihedral angle of approximately 40 degrees between the planes P1 and P2. In contrast, in second alignment or orientation A2 (FIGS. 4, 9), where the faces 42 and 46 are mated in opposition to one another such that the plane P1 blends with the plane P2, the angles α and β offset each other to form a combined dihedral angle of approximately 0 degrees between the planes P1 and P2. That is, in orientation A2, the plane P1 is coplanar with the plane P2. In both alignments or orientations A1 and A2, the face 42 and the face 46 are held in close contact with one another due to the respective shapes and sizes of the key slot 44 and the dovetail 48 when the dovetail 48 is positioned in the key slot 44. Further, a bore 50 extends through the center of the channel 30 of the bar bed 26 in the upper member 20, and matching threaded bolt holes 52 and 54 are formed in the center of the lower member 34. The bore 50 is sized to allow the anchor bolt 14 to snugly slide through, while the bolt holes 52 and 54 are each sized to match and threadingly receive the anchor bolt 14 so that the anchor bolt 14 can be used to releasably secure the upper member 20 to the lower member 34 when the dovetail 48 is properly positioned in the key slot 44. It will be appreciated that bolt hole 52 runs parallel to the plane P2 so as to align with the bore 50 when the upper member 20 and the lower member 34 are in alignment A1. Conversely, bolt hole 54 is formed at an angle of approximately 20 degrees off center from the plane P2 so as to align with the bore 50 when the upper member 20 and the lower member 34 are in alignment A2.

As can be further appreciated, by merely loosening the anchor bolts 14 in each of the risers 12, a user can slide the dovetail 48 out of the key slot 44 to separate the upper member 20 from the lower member 34, then orient the upper member 20 relative to the lower member 34 to selectively choose between alignment A1 and A2 for the risers 12. Moreover, it is contemplated that the upper member 20 and the lower member 34 can each be constructed in a variety of configurations to provide a wide range of desired angles between the upper member and the lower member, vis-à-vis, between the planes P1 and P2. This can be achieved, for example, by changing the angle of one or both of the faces 42 and 46 from 20 degrees off-center to some other desired angle. In fact, the angles α and β can be different from each other, although such a riser cannot be assembled in a straight configuration such as A2. Further, a wide variety of heights for the risers 12 can be achieved by changing the lengths of one or more of the upper member 20 and/or the lower member 34. Of course, these alterations may require adjustment to the key slot 44 and the dovetail 48, which one of ordinary skill in the art will recognize after having read this disclosure.

Referring now to FIGS. 11-14, an alternate embodiment of the present disclosure is depicted, which is generally referred to as a riser assembly 100. The riser assembly 100 is identical to the riser assembly 10 except that instead of two separate bar clamps 16, the riser assembly 100 includes a single unified bar clamp 102 that secures the handlebar H to each of the risers 12.

While I have described in the detailed description several configurations that may be encompassed within the disclosed embodiments of this invention, numerous other alternative configurations, that would now be apparent to one of ordinary skill in the art, may be designed and constructed within the bounds of my invention as set forth in the claims. Moreover, the above-described novel mechanisms of the present invention, shown by way of example at 10 and 100 can be arranged in a number of other and related varieties of configurations without departing from or expanding beyond the scope of my invention as set forth in the claims.

For example, the upper member 20 and lower member 34 of the risers 12 need not be straight or have a uniform cross-section, but can have angles or curves or other shapes along their lengths if so desired. Similarly, the upper member 20 and the lower member 34 need not have the specific shapes as shown in embodiments 10 and 100, but can have a wide variety of shapes and sizes so long as the upper member 20 and the lower member 34 are adapted to join together in two or more desired alignments or orientations, such as A1 and A2, as herein disclosed. Further, each of the risers 12 can be configured to have more than two members, and each of the members can be designed to mate together with its adjacent member in more than one alignment.

By way of further example, the various components of the riser assemblies 10 and 100, such as for example the upper member 20 and lower member 34 of each riser 12, and for example the bar clamp 16 and bar bed 26, can be attached to one another by means other than the bolts 14 and 18 respectively, including for example, clamps, screws, latches, etc. In addition, while it is contemplated that the riser members are to preferably releasably attach to one another, it is also considered that the riser members can also attach to one another in a permanent manner.

By way of further example, the risers 12 can be adapted for use in a wide variety of vehicles other than motorcycles, and can be configured to attach to control devices other than a handlebar, such as for example, a hand grip or a wheel.

By way of further example, the risers 12 can be configured to have multiple mating surfaces (such as the faces 42 and 46), set at differing angles relative to the central planes P1 and P2, with corresponding rotational orientations about the central axes X2 and X3, such that the upper member 20 can align with the lower member 34 in more than two orientations to provide multiple configurations for a single riser 12.

Additional changes can be made in the above constructions without departing from the scope of the disclosure. It is intended that all matter contained in the above description or shown in the accompanying drawings shall be interpreted as illustrative and not in a limiting sense.

What is claimed is:

1. A configurable riser for a vehicle having a hand grip for steering, said hand grip having an attachment portion, said riser comprising:
   an upper member, said upper member having a lower end and an upper end opposite the lower end, said upper end comprising a hand grip fastener, said hand grip fastener being sized and shaped to releasably attach to said attachment portion of said hand grip, said lower end of said upper member comprising a first attachment face, said upper member having a central axis, said central axis extending from said lower end to said upper end generally through the center of said upper member;

a lower member, said lower member having a lower end and an upper end opposite the lower end, said lower end shaped and sized for releasable attachment to said vehicle, said lower end being directed downward when said lower member is attached to the vehicle, said upper end comprising a second attachment face, said lower member having a central axis, said central axis extending from said lower end to said upper end of said lower member generally through the center of said lower member; and wherein said first attachment face releasably and selectively attaches to said second attachment face in a first alignment or in a second alignment, said first attachment face being oriented at a first rotational position about the upper member central axis relative to the second attachment face when in said first alignment, said first attachment face being oriented at a second rotational position about the upper member central axis relative to the second attachment face when in said second alignment, wherein the difference between said first and second rotational positions is greater than ninety degrees, and wherein said upper member central axis orienting at a first angle relative to said lower member central axis when said first attachment face attaches to said second attachment face in said first alignment, said upper member central axis orienting at a second angle relative said lower member central axis when said first attachment face attaches to said second attachment face in said second alignment, said first angle being different from said second angle.

2. The riser of claim 1, wherein the difference between said first and second rotational positions is approximately one hundred eighty degrees.

3. The riser of claim 1, wherein said first angle is between ten and forty-five degrees.

4. The riser of claim 3, wherein said first angle is approximately forty degrees.

5. The riser of claim 1, wherein said second angle is between negative ten and positive ten degrees.

6. The riser of claim 5, wherein said second angle is approximately zero degrees.

7. The riser of claim 1, wherein said first attachment face comprises a first engagement surface, said second attachment face comprises a second engagement surface, said first and second engagement surfaces mating to form a generally planar attachment interface therebetween when said upper member attaches to said lower member.

8. The riser of claim 7, wherein one of said first and second engagement surfaces is substantially planar.

9. The riser of claim 1, wherein said hand grip comprises a handlebar.

10. The riser of claim 1, wherein said hand grip fastener comprises a bar bed, said bar bed comprising an upward facing surface shaped and sized to mate with the attachment portion of said hand grip of said vehicle.

11. The riser of claim 10, further comprising a bar clamp, said bar clamp being shaped and sized to releasably attach to said bar bed and secure said attachment portion of said hand grip to said bar bed.

12. The riser of claim 11, wherein said first attachment face at least in part slides against said second attachment face to connect said first and second attachment faces.

13. The riser of claim 1, wherein one of said first and second attachment faces comprises a key slot and the other of said first and second attachment faces comprises a protrusion, said protrusion being shaped and sized to fit in said key slot.

14. A configurable riser for a vehicle having a hand grip for steering, said hand grip having an attachment section, said riser comprising an upper member and a lower member, said upper member having a proximal end and a distal end opposite said proximal end, said distal end directed generally upward from said proximal end and comprising a fastener, said fastener being sized and shaped to secure at least a portion of said vehicle hand grip to said distal end, said lower member having a proximal end and a distal end opposite said proximal end, said lower member distal end shaped and sized for releasable attachment to said vehicle and being directed generally downward when said lower member is attached to said vehicle, said upper member proximal end comprising a first fitting, said proximal end of said lower member comprising a second fitting, said first fitting attaching to said second fitting to form an interface therebetween, said interface defining a transverse plane, said first fitting selectively attaching to said second fitting in a first orientation or in a second orientation, said upper member having a first lateral plane extending upward from the center of said upper member proximal end to the center of said upper member distal end, said lower member having a second lateral plane extending downward from the center of said lower member proximal end to the center of said lower member distal end, said first lateral plane and said second lateral plane forming a first dihedral angle therebetween when said first fitting attaches to said second fitting in said first orientation, said first lateral plane and said second lateral plane forming a second dihedral angle therebetween when said first fitting attaches to said second fitting in said second orientation, and wherein one of said first and second dihedral angles is one of less than or equal to ten degrees, greater than or equal to fifteen degrees and less than or equal to twenty-five degrees, or greater than or equal to thirty degrees and less than or equal to forty-five degrees.

15. The riser of claim 14, wherein said first and second dihedral angles each comprise an alpha angle component and a beta angle component, and wherein at least one of the first and second dihedral angles comprises the respective alpha angle component being equal to the respective beta angle component.

16. The riser of claim 14, wherein one of said first and second dihedral angles is one of approximately zero degrees and approximately twenty degrees.

17. The riser of claim 14, wherein one of said first and second fittings comprises a key slot and the other of said first and second fittings comprises a protrusion, said protrusion being shaped and sized to fit in said key slot.

18. The riser of claim 14, wherein said first and second fittings form an elongated interlocking dovetail interface.

\* \* \* \* \*